US005924541A

United States Patent [19]
Lee

[11] Patent Number: 5,924,541
[45] Date of Patent: Jul. 20, 1999

[54] TIME DISPLAYING APPARATUS AND METHOD FOR AUTOMATIC VENDING MACHINE

[75] Inventor: Hee-Soo Lee, Kwangju, Rep. of Korea

[73] Assignee: Kwangju Electronics Co., Ltd., Kwangju-city, Rep. of Korea

[21] Appl. No.: 08/865,295

[22] Filed: May 29, 1997

[30] Foreign Application Priority Data

Jul. 13, 1996 [KR] Rep. of Korea ...................... 96-28351

[51] Int. Cl.$^{6}$ .............................. G06F 7/00; B65B 59/00; B67D 5/08; G04B 47/00

[52] U.S. Cl. ............................ 194/217; 221/15; 222/638; 368/10

[58] Field of Search .............................. 194/217; 221/15; 222/638, 644; 368/10, 13

[56] References Cited

U.S. PATENT DOCUMENTS

| | | | |
|---|---|---|---|
| 3,729,117 | 4/1973 | Naito et al. | 221/9 |
| 4,216,461 | 8/1980 | Werth et al. | 194/216 |
| 4,369,442 | 1/1983 | Werth et al. | 194/217 |
| 4,616,323 | 10/1986 | Hayashi | 364/479.02 |
| 4,893,705 | 1/1990 | Brown | 194/211 |
| 5,028,766 | 7/1991 | Shah | 235/381 |
| 5,722,526 | 3/1998 | Sharrard | 194/346 |

*Primary Examiner*—F. J. Bartuska
*Assistant Examiner*—Bryan J. Jaketic
*Attorney, Agent, or Firm*—Perman & Green, LLP

[57] ABSTRACT

A time displaying apparatus and method for an automatic vending machine is able to display current time and operation state so that user can conveniently use the vending machine. A time displaying apparatus for an automatic vending machine has a timer for counting a current time. A control part generate a control signals to display a current time counted by the timer when coins are not inserted in the mechanism after having checked the state of coins inserted, to display the amount of coins detected by the coin detecting mechanism when the coins are inserted. A display part displays selectively the current time or the amount of coins according to the control signal of the control part.

1 Claim, 2 Drawing Sheets

TIME DISPLAYING APPARATUS AND METHOD FOR AUTOMATIC VENDING MACHINE

BACKGROUND OF THE INVENTION

1. Field of the Invention

This invention relates, in general, to an automatic vending machine, and more particularly to time displaying apparatus and method for an automatic vending machine which enables to display current time and operation state so that user can conveniently use the vending machine.

2. Description of the Prior Art

Generally, automatic vending machines have been widely used in countries. The automatic vending machines keeping various goods therein such as coffee, cigarette, cake, and candy have a goods safekeeping chamber and determines what kind of goods can be vended by an amount or sum of coins inserted by an user.

In these automatic vending machines, when coins are inserted into the automatic vending machine and a selecting button to a predetermined goods is pushed, the goods is extracted from a goods extract part of the automatic vending machine.

As shown in FIG. 1, a goods selecting apparatus of a conventional automatic vending machine includes a coin detecting mechanism 1 for providing a detected signal according to a coin state of inserted coins and the amount of the coins to be inserted in the automatic vending machine, a goods selecting part 2 for selecting a predetermined article among goods stored or provided therein, a control part 3 for generating a control signal to display a selling possibility state of goods befitting the inserted coins and the amount of the coins according to the detected signal from the coin detecting mechanism 1 and to extract the goods selected from the goods selecting part 2, a display part 4 for displaying the total inserted amount of coins and a selling possibility state of the automatic vending machine according to a display control signal from the control part 3, and a goods extracting part 5 for extracting a selected goods according to a extracting control signal output from the control part 3.

Now, goods selecting and operating process of the conventional automatic vending machine will be explained hereinafter.

When coins are inserted through a coin inserting slot (not shown), condition of the coins or the bill and the amount of coins or bill are detected by a plurality of sensors (not shown) of the coin detecting mechanism 1 and a signal detected therefrom is provided to the control part 3. The control part 3 generates a control signal for displaying the total inserted amount of the coins according to the detected signal from the coin detecting mechanism 1. The display part 4 displays a selling possibility state according to the control signal from the control part 3 in case the total inserted amount of coins exceeds the price of the goods stored in the automatic vending machine.

After the selling possibility state of the goods shown in the display part 4 has confirmed, a selecting button is pushed by the user to cause the selected goods to be extracted from the automatic vending machine.

A button signal corresponding to the goods selected from goods selecting part 2 is provided to the control part 3. At this time, the control signal for extracting the selected goods is generated from the control part 3.

Accordingly, the article desired by the user among goods stored in the automatic vending machine is extracted through the goods extracting part 5 according to the control signal output from the control part 3 so that the user can obtain to the desired article.

SUMMARY OF THE INVENTION

It is, therefore, an object of the invention to provide a time displaying apparatus and method for an automatic vending machine which enables to display current time and operation state so that user can conveniently use the vending machine.

In order to accomplish the above object, there is provided a time displaying apparatus for an automatic vending machine, the apparatus comprising:

- a timer for counting a current time;
- a control part for generating a control signal to display said current time counted by the timer when coins are not inserted into the automatic vending machine and for generating a control signal to display the amount of coins detected by a coin detecting mechanism when the coins are inserted; and
- a display part for selectively displaying the current time or the amount of coins according to the control signal of the control part.

In order to accomplish the above object, there is provided a time displaying method for an automatic vending machine, the method comprising the steps of:

- counting a current time by a timer after the automatic vending machine has started to be initialized with predetermined input parameters according to a control signal of the control part when an AC voltage is provided from outside to the automatic vending machine;
- checking whether coins are inserted into the automatic vending machine; and
- displaying the current time according to the control signal of the control part when the coins are not inserted into the automatic vending machine, and the amount of inserted coins according to the control signal of the control part when the coins are inserted into the automatic vending machine.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

The invention will now be described in detail with reference to the accompanying drawings.

Figure 1:
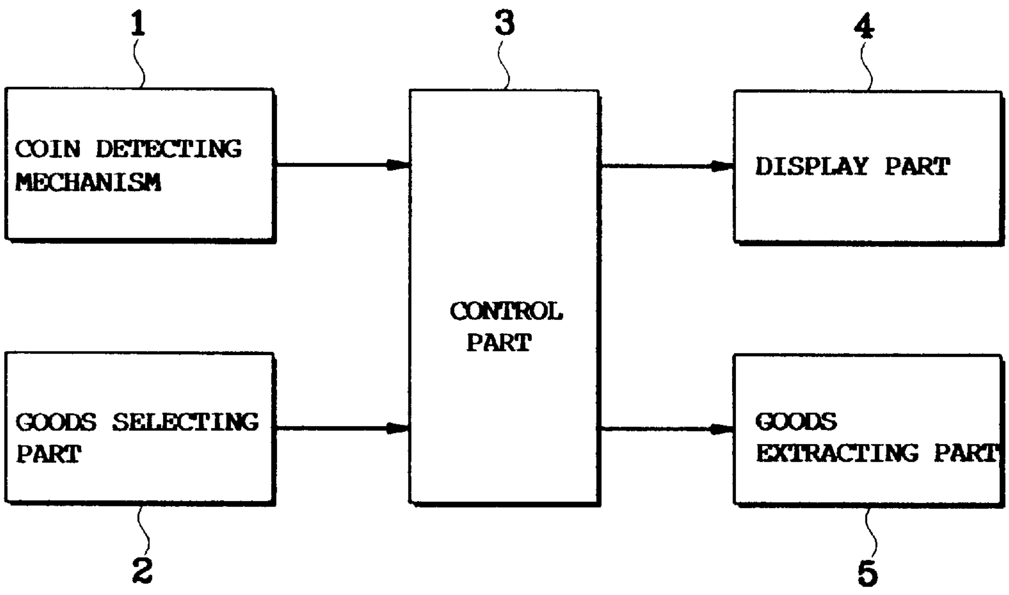
Fig.1 (PRIOR ART)
FIG. 1 is a schematic block diagram of a conventional automatic vending machine.
Figure 2:
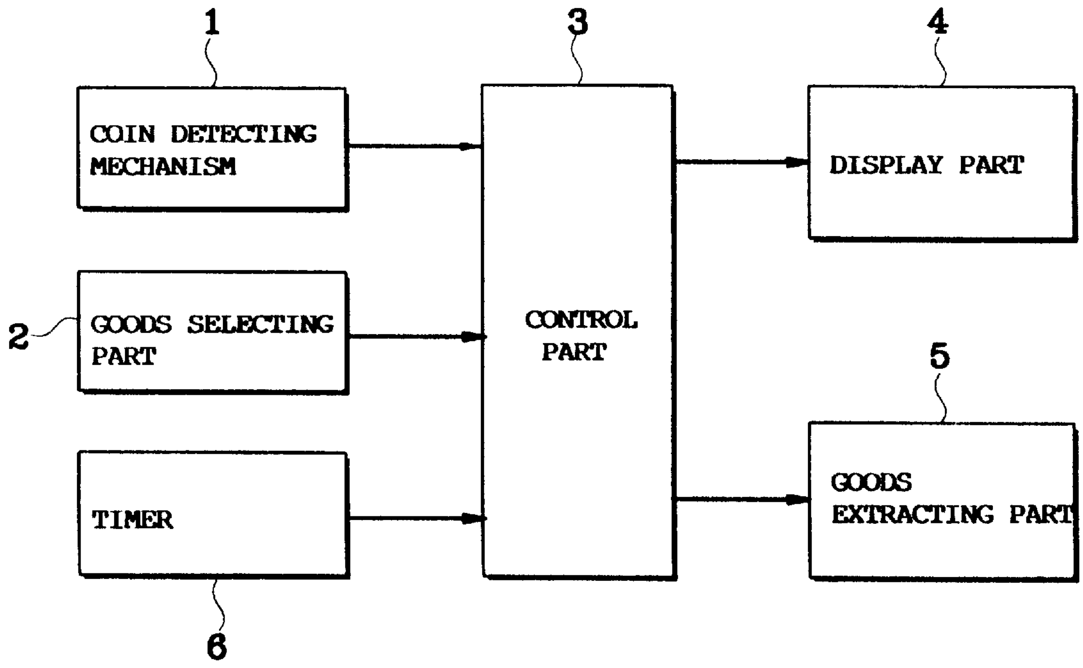
FIG. 2 is a schematic block diagram of a time displaying apparatus for an automatic vending machine according to a preferred embodiment of the present invention.

Referring to FIG. 2, there is shown a time displaying apparatus for an automatic vending machine according to the present invention, the apparatus comprising a coin detecting mechanism 1, a goods selecting part 2, a control part 3, a display part 4, a goods extracting part 5 and a timer 6.

Also, the basic elements (for example, the coin detecting mechanism 1, the goods selecting part 2, the goods extracting part 5 ) of the invention are similarly constructed as those of the conventional automatic vending machine and description of the similar basic elements will be not described hereinafter.

In FIG. 2, the reference numeral 4 is a display part of the automatic vending machine. The reference numeral 6 is the timer of the automatic vending machine.

The timer 6 counts a current time and send a signal corresponding to the current time to the control part 3. When an AC voltage is provided from outside to a power part (not shown), the control part 3 starts to be initialized with predetermined input parameters according to a control signal of the control part 3.

The control part 3 checks whether coins are inserted into the automatic vending machine by a plurality of sensors (not shown) of the coin detecting mechanism 1. When the coins are not inserted in the coin detecting mechanism, the control part 3 generates a control signal to display a current time counted by the timer 6. After the coin has been inserted in the coin detecting mechanism 1, the control part 3 generates a control signal to display the amount of coins detected by the coin detecting mechanism 1.

The display part 3 displays selectively the current time or the amount of coins by the control signal from the control part 3.

Now, the time displaying method for the automatic vending machine of the present invention will be described with reference to FIGS. 2 and 3.

Figure 3:
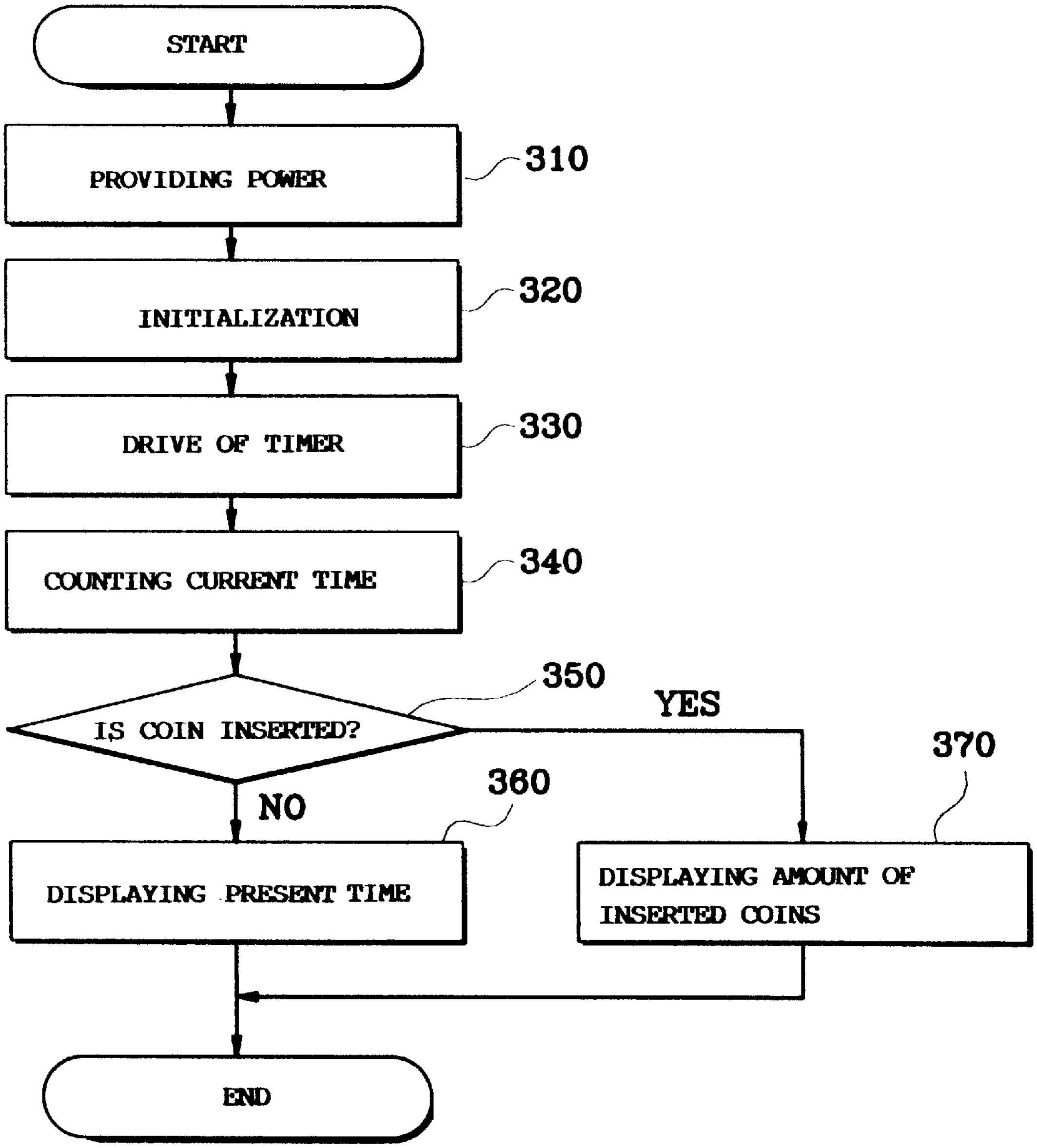
FIG. 3 is a flowchart for explaining a time displaying process of the automatic vending machine according to the embodiment of the present invention.

As shown in FIG. 3, when an AC voltage is provided from outside to a power part (not shown) at step 310, the automatic vending machine starts to be initialized with predetermined input parameters according to a control signal of the control part 3 at step 320.

The timer 6 is driven at step 330 thereby counting the current time at step 340. At this time, the control part 3 also determined whether coins are inserted in the coin detecting mechanism 1 by the sensors (not shown) at step 350.

As a result of the determination at step 350, when the coins are not inserted in the coin detecting mechanism 1, the control part 3 generates the control signal to display the current time counted by the timer 6 and outputs to the display part 4. The display part 4 displays the current time according to the control signal of the control part 3 at step 360.

After a result of the determination at step 350, when the coins are inserted in the coin detecting mechanism 1, the control part 3 generates the control signal to display the amount of coin detected by the coin detecting mechanism 1 and outputs to the display part 4. The display part 4 displays the amount of coins according to the control signal of the control part 3 at step 370.

Subsequently, when a button is pushed by an user to be selected a goods, a button signal is provided to the control part 3. The control part 3 generates a control signal for extracting the selected goods by the user from the goods storing chamber according to the button signal. The selected goods from the goods storing chamber are extracted through the goods extracting part 5 according to the the control signal of the control part 3 so that the user can purchase his own desired goods utilizing the automatic vending machine.

As described above, when the coins are not inserted in the coin detecting mechanism 1, the display part 4 displays the current time according to the control signal of the control part 3. Meanwhile, when the coins are inserted in the coin detecting mechanism 1, the display part 4 displays the amount of coins according to the control signal of the control part 3.

As described above, there is an advantage in a time displaying apparatus and method for an automatic vending machine according to the present invention, in that the display part displays the current time so that the user confirm the normal operation state of the automatic vending machine while the user is waiting the goods to be extracted.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A time displaying method for an automatic vending machine comprising the steps of:

counting a current time by a timer after the automatic vending machine has started to be initialized with predetermined input parameters according to a control signal of the control part when an AC voltage is provided from outside to the automatic vending machine;

checking whether coins are inserted into the automatic vending machine; and displaying the current time externally on the automatic vending machine according to the control signal of the control part when the coins are not inserted into the automatic vending machine, and the amount of inserted coins according to the control signal of the control part when the coins are inserted into the automatic vending machine.

* * * * *